United States Patent [19]

Suzuki

[11] Patent Number: 4,569,922

[45] Date of Patent: Feb. 11, 1986

[54] SILICON CARBIDE-ALUMINUM NITRIDE SINTERED ARTICLE AND PROCESS FOR ITS PRODUCTION

[75] Inventor: Keiichiro Suzuki, Yokohama, Japan

[73] Assignee: Asahi Glass Company Ltd., Tokyo, Japan

[21] Appl. No.: 558,896

[22] Filed: Dec. 7, 1983

[30] Foreign Application Priority Data

Dec. 8, 1982 [JP] Japan ................................ 57-213984

[51] Int. Cl.[4] ............................................. C04B 35/56
[52] U.S. Cl. ...................................... 501/89; 501/92; 264/65
[58] Field of Search ...................... 501/89, 92; 264/65

[56] References Cited

U.S. PATENT DOCUMENTS

| | | | |
|---|---|---|---|
| 3,259,509 | 7/1966 | Matkovich et al. | 501/92 |
| 3,287,478 | 11/1966 | Pallen et al. | 501/92 |
| 4,230,497 | 10/1980 | Schwetz et al. | 501/89 |
| 4,332,755 | 6/1982 | Murata | 264/65 |

FOREIGN PATENT DOCUMENTS 0952554  3/1964  United Kingdom ................. 501/89

*Primary Examiner*—Andrew H. Metz
*Assistant Examiner*—Terryence Chapman
*Attorney, Agent, or Firm*—Oblon, Fisher, Spivak, McClelland & Maier

[57] ABSTRACT

A silicon carbide sintered article composed essentially of elongated and/or plate-like grains of a SiC-AlN solid solution consisting essentially of from 2 to 20% by weight of Al, from 0.2 to 10% by weight of N, from 0.2 to 5% by weight of O, from 0 to 15% by weight of a Group IIIa element, and the rest being substantially Si and C.

27 Claims, 2 Drawing Figures

5 μM

5 μM

5 μM

SILICON CARBIDE-ALUMINUM NITRIDE SINTERED ARTICLE AND PROCESS FOR ITS PRODUCTION

The present invention relates to a silicon carbide sintered article and a process for its production. More particularly, the present invention relates to a silicon carbide sintered article composed essentially of a SiC-AlN solid solution, which is highly dense and has high strength even at high temperatures, and which can be produced even by pressureless sintering of a green body.

Like a sintered aritlce of silicon nitride, the silicon carbide sintered article is a prospective material as one of engineering ceramics. There have been a number of proposals with respect to such a silicon carbide sintered article and its production. As the process, there may be mentioned, for instance, a reaction sintering method, a hot pressing method or a pressureless sintering method. In the reaction sintering method, metallic silicon is impregnated in e.g. a carbonaceous green body, and they are reacted at their reaction temperature to form a silicon carbide sintered article, whereby no substantial shrinkage takes place during the sintering. Thus, this method has an advantage that it is thereby possible to obtain an optionally intricately shaped sintered article. However, there is a drawback that the strength tends to drop sharply at a temperature of about 1400° C. In the hot pressing method, a small amount of a boron compound, aluminum metal or an aluminum oxide is mixed with silicon carbide powder, and the mixture is treated at high temperature under high pressure by means of a mold, whereby a sintered article is obtainable which usually has high strength and high density as compared with the sintered products obtainable by the reaction sintering or pressureless sintering. In order for the hot pressed article to be used as a high temperature structual material such as parts of a gas turbine or the like to utilize the superior properties of silicon carbide such as the heat resistance, oxidation resistance and thermal shock resistance at high temperatures, it is required to have high strength not only at room temperature but also at high temperatures. Hot pressed articles which satisfy these requirements, are being developed. Namely, there have been proposed hot pressed silicon carbide articles having high strength even at high temperatures, for instance, in Japanese Unexamined Patent Publication No. 47275/1980 which discloses a sintered article composed solely of specially treated silicon carbide powder; Japanese Unexamined Patent Publication No. 67572/1980 which discloses a silicon carbide sintered article containing aluminum nitride and/or boron nitride; Japanese Unexamined Patent Publication No. 92168/1981 which discloses a silicon carbide sintered article containing a magnesium source; and Japanese Unexamined Patent Publication No. 92169/1981 which discloses a silicon carbide sintered article containing a beryllium component, a boron component or an aluminum component. However, all of these sintered articles are prepared by hot pressing, and they are restricted to simple configurations. Because of the drawback that they are incapable of being formed into a desired shape, they are not yet totally satisfactory as useful engineering ceramics.

On the other hand, in the pressureless sintering method, a suitable sintering aid is incorporated, whereby a green body of silicon carbide powder which is normally hardly sintered, can be sintered in an atmosphere under atmospheric pressure or under pressure in the vicinity of atmospheric pressure. By this method, it is possible to obtain a highly dense high strength sintered article having any desired shape. However, its strength, particularly its high temperature strength, is still inadequate, and it has other drawbacks. Namely, Japanese Unexamined Patent Publication No. 42577/1982 discloses a silicon carbide sintered article obtained by pressureless sintering with an addition of a small amount of aluminum oxide. However, its flexural strength at 1400° C. is 58 kg/mm$^2$ at best. Whereas, Japanese Unexamined Patent Publication No. 88079/1982 discloses a carbide silicon sintered article obtained by pressureless sintering with an addition of carbonaceous material, which has a flexural strength of about 71 kg/mm$^2$ at 1200° C. However, this article requires siliconizing treatment subsequent to the pressureless sintering. Further, like a reaction sintered article, this article is believed to have a drawback that the strength tends to sharply drop at a temperature of about 1400° C.

There have been some reports also on sintered articles of a mixture of SiC and AlN.

According to Japanese Unexamined Patent Publication No. 3396/1980, a mixture of SiC powder and AlN powder is sintered pressurelessly, or SiC powder is sintered in an AlN atmosphere at atmospheric pressure to obtain a sintered article of a mixture of SiC and AlN. In the production of this sintered article, carbon or a carbon source is incorporated into the SiC powder, and the density of the sintered article is only 93.3% at best.

In U.S. Pat. No. 4,230,497 (Japanese Unexamined Patent Publication No. 118411/1979), Schwetz et al. disclose a sintered α-SiC article containing small amount of aluminum and additional carbon, which is obtained by pressureless sintering of SiC powder with an addition of a small amount of an aluminum source such as AlN together with carbon source. This sintered article contains only 0.1% by weight of oxygen, and the high temperature flexural strength of this sintered article is only 640 N/mm$^2$ (i.e. 65 kg/mm$^2$). Further, in its production, it is not easy to uniformly disperse a small amount of the carbon source in the starting material.

In U.S. Pat. No. 4,326,039 (Japanese Unexamined Patent Publication No. 9277/1981) or Japanese Unexamined Patent Publication No. 167179/1980, Kriegesmann et al. disclose a β-SiC sintered article or a α-SiC sintered article containing a small amount of aluminum, which is obtained by hot pressing SiC powder containing a small amount of an aluminum source such as Al or AlP. However, it is likewise emphasized to minimize the oxygen content in the sintered article, and the high temperature strength of the sintered article thereby obtained is only 670 N/mm$^2$ (i.e. 68 kg/mm$^2$). Further, a silicon carbide sintered article of this type is poor in its toughness as in the case of a silicon carbide pressureless sintered article containing boron and carbon, and it has a drawback such that tipping is likely to occur during its use or processing.

Recently, researches on sintered articles of SiC-AlN solid solutions have been started.

Rafaniello et al. have reported that by using AlCl$_3$.6-H$_2$O, starch and SiO$_2$ fine powder as starting materials, SiC-AlN solid solution powder was prepared, and by adding a small amount of carbon thereto, a sintered article of the SiC-AlN solid solution was prepared (J. Materials Sci. 16(1981)3479). This sintered article was prepared by a hot pressing method, and its microstructure is considered to be composed mainly of equiaxed grains. As such, the sintered article does not attain the purpose of the present invention.

Ruh et al. have reported to obtain a sintered article of a SiC-AlN solid solution by hot pressing a mixture of β-SiC powder and AlN powder in vacuum (J. Am. Chem. Soc. 65(1982)260). However, this sintered article likewise has a microstructure composed of equiaxed grains, and the flexural strength at room temperature is as low as from 17 to 27 kg/mm$^2$.

The present inventor has conducted extensive researches with an aim to obtain a silicon carbide sintered article having desired properties equivalent or superior to the properties of a hot pressed article, which is capable of being prepared by pressureless sintering instead of hot pressing, and has already made several proposals. It has been found that a silicon carbide sintered article containing a specific amount of AlN and a specific amount of an oxide of a Group IIIa element, can be prepared by a pressureless sintering method, and the sintered article is superior particularly in its properties such as strength and density. From a further study, the microstructure of such a silicon carbide sintered article has been made clear, and it has been found that a silicon carbide sintered article containing specific amounts of aluminum, nitrogen and oxygen has desirable properties. The present invention is based on these discoveries.

Namely, the present invention provides a silicon carbide sintered article composed essentially of elongated and/or plate-like grains of a SiC-AlN solid solution consisting essentially of from 2 to 20% by weight of Al, from 0.2 to 10% by weight of N, from 0.2 to 5% by weight of O, from 0 to 15% by weight of a Group IIIa element, and the rest being substantially Si and C.

Now, the present invention will be described in detail with reference to the preferred embodiments.

BRIEF DESCRIPTION OF THE FIGURES

In the accompanying drawings.

Figure 1:
FIG. 1 is a scanning electron microscopic photograph showing the microstructure of the sintered article obtained in Example 6.

The sintered article of the present invention is composed mainly of elongated and/or plate-like grains. Here, the elongated or plate-like grains are meant for grains which have a ratio of L/R of at least 3/1 where L is the length of a grain and R is the smallest diameter of the grain taken in a plane at right angles to the length at the center of the length of the grain, as three-dimensionally observed. Practically, the grains are observed two-dimensionally by microscopic observation of the polished cut surface of the sintered article of the present invention. In such two-dimensional observation, grains having a ratio of L'/R' of at least 3/1 where L' is the length of each grain and R' is the diameter of the grain taken along a line at right angles to the length at the center of the length of the grain, belong to the elongated or plate-like grains. When the sintered article of the present invention is observed by such two-dimensional observation, the number of grains having a ratio of L'/R' of at least 3/1 is at least 1/3, preferably at least 1/2, of the total number of grains.

The greater the ratio L/R is, the better the mechanical properties of the sintered article become. Likewise, the greater the proportion of the grains having the L/R ratio of at least 5/1 is, the greater the strength of the sintered article becomes. Namely, it is more preferred that the number of grains having the L'/R' ratio of at least 5/1 is at least 1/2 of the total number of grains.

The average grain size as defined to be an average value of L' is preferably less than 10 μm, whereby the strength of the sintered article is improved. The average grain size is more preferably less than 5 μm, whereby the improvement of the strength is more remarkable. The above-mentioned microstructure of the sintered article provides not only the effect of improving the strength but also an effect of improving the toughness.

The grains are made of a SiC-AlN solid solution, wherein an atomic ratio of Si/C is about 1, and an atomic ratio of Al/N is about 1 or more, in many cases. The grains may contain small amounts of oxygen and/or Group IIIa elements in addition to the above-mentioned four elements.

At grain boundaries of the grains, there exists a grain boundary phase which is supposed to contain Si, Al, O, N and C and which, in some cases, further contains Group IIIa elements. The major proportions of oxygen and Group IIIa elements in the sintered article of the present invention are believed to be present in this grain boundary phase. This grain boundary phase may be glassy, but is preferably crystalline, whereby the high temperature strength of the sintered article is improved. When the grain boundary phase contains Group IIIa elements, the softening temperature of the grain boundary phase tends to be high, and the high temperature strength is believed to be thereby improved.

The theoretical density of silicon carbide is 3.21. If an additional component exist, the theoretical density varies correspondingly to some extent. The sintered article of the present invention has a density greater than 90% of such a theoretical density. Further, in the present invention, it is possible to readily obtain a highly dense sintered article having a density greater than 95%, especially greater than 98%, of the theoretical density.

The sintered article of the present invention contains from 2 to 20% by weight of Al, from 0.2 to 10% by weight of N and from 0.2 to 5% by weight of O, as essential components of the chemical composition. Further, it may contain less than 15% by weight of Group IIIa elements, as a non-essential component. The rest is composed substantially of Si and C, the majority of which exists in the form of a SiC-AlN solid solution.

The sintered article of the present invention may be composed solely of Si, C, Al, N, O and Group IIIa elements. However, it may contain other elements in a small amount, for example at most 1% by weight, so long as they do not impair the properties of the sintered article of the present invention.

One of the important features of the sintered article of the present invention is that it contains a specific amount of oxygen. In the conventional sintered articles of silicon carbide, the presence of oxygen has been regarded to constitute a hindrance in achieving a high density or high strength. It has been believed that since the surface of the silicon carbide powder as the starting material is inevitably oxidized to silicon oxide, the purity is degraded, and that such oxidation should be avoided. In order to prevent the possibility that the sintered article contains such an oxide, it has been common to add carbon or a carbon source which is capable of being converted to carbon, to the starting material. Whereas, in the sintered article of the present invention, the presence of oxygen is essential. Accordingly, it is advantageous that silicon carbide powder which is not necessarily highly pure, i.e. which contains an oxide such as silicon oxide, can be used as the starting material. Further, it is also advantageous that the incorporation of carbon or a carbon source which requires a cumbersome process step, is not required.

The total amount of Al and N in the sintered article of the present invention is preferably from 4 to 20% by weight, more preferably from 5 to 15% by weight, of the sintered article, whereby the sintered article will be composed of grains having a high L/R ratio and a small average grain size, and its strength will be high.

The sintered article of the present invention which contains no Group IIIa elements, has a flexural strength greater than 60 kg/mm$^2$ both at room temperature and at 1400° C. In this case, it is preferred that Al is from 5 to 15% by weight, N is from 0.4 to 10% by weight and O is from 0.4 to 3% by weight, whereby the flexural strength at 1400° C. will be as high as greater than 65 kg/mm$^2$.

When the sintered article contains a Group IIIa element, the strength at room temperature as well as at high temperatures will be improved over the sintered article containing no Group IIIa element. Particularly preferred is a sintered article which contains from 3 to 15% by weight of Al, from 0.2 to 10% by weight of N, from 0.2 to 4% by weight of O and from 0.1 to 10% by weight of a Group IIIa element, whereby the flexural strength at room temperature and at 1400° C. will be higher than 70 kg/mm$^2$ or even greater than 80 kg/mm$^2$.

Here, the Group IIIa element is meant for at least one element selected from the group consisting of Sc, Y, and elements having atomic numbers 57 to 71 and 89 or greater. Among them, at least one element selected from the group consisting of Y, La and Ce is preferable, since the starting materials are then readily available, and the chemical stability of the sintered article will be good.

Further, it is preferred that the sintered article contains from 0.4 to 3% by weight of O, whereby the L/R ratio of the grains becomes high, and the density of the sintered article also becomes high. Particularly preferred is a sintered article which contains from 0.5 to 2% by weight of O, whereby the L/R ratio becomes greater than 5, and the density of the sintered article will be greater than 98% of the theoretical density.

The silicon carbide sintered article composed essentially of elongated and/or plate-like grains of a SiC-AlN solid solution and having a high density and superior mechanical properties, can be prepared by a process which comprises:

(a) a step of mixing refractory starting material sources to form a mixture which comprises, as calculated as refractory starting materials, (1) from 50 to 97% by weight of SiC powder, (2) from 3 to 30% by weight of AlN powder, (3) from 0 to 15% by weight of a Group IIIa element source and (4) from 0 to 20% by weight of at least one member selected from the group consisting of a SiO$_2$ source, an Al$_2$O$_3$ source and Si$_3$N$_4$;

(b) a step of molding the mixture to obtain a green body; and (c) a step of sintering the green body in a non-oxidizing atmosphere at a temperature of from 1900° to 2300° C.

Here, the refractory starting materials are meant for refractory components which remain when the refractory starting material sources are treated at a high temperature, e.g. 1000° C. With respect to the SiC powder, AlN powder, metallic yttrium, etc., the refractory starting material sources and the refractory starting materials are substantially the same. However, in a case where e.g. lanthanum hydroxide La(OH)$_3$ as a Group IIIa element source, or aluminum ethoxide Al(OC$_2$H$_5$)$_3$ as an Al$_2$O$_3$ source was used as the refractory starting material source, lanthanum oxide La$_2$O$_3$ or aluminum oxide Al$_2$O$_3$, respectively, corresponds to the refractory starting material. The proportions of the refractory starting material sources mentioned hereinafter are proportions as calculated as the corresponding refractory starting materials, based on the total amount of the refractory starting materials.

The average particle size of the SiC powder is preferably at most 5 μm, whereby a sintered article having a density greater than 95% of the theoretical density is obtainable. It is particularly preferred that the average particle size is at most 1 μm, whereby a sintered article having a higher density is obtainable.

The crystal form of the SiC powder may be an α-form or a β-form. However, it is preferred to use β-form SiC powder, whereby the proportion of the elongated and/or plate-like grains tends to increase, and the L/R ratio tends to be high.

For the same reasons as in the case of the SiC powder, it is preferred that each of the AlN powder, the Group IIIa element source, the SiO$_2$ source, the Al$_2$O$_3$ source and Si$_3$N$_4$ is in a powder form having an average particle size of at most 5 μm, more preferably at most 1 μm.

The essential components as the refractory starting material sources to be used in the preparation of the sintered article, are SiC powder and AlN powder. In a typical embodiment, it is possible to employ a mixture consisting essentially of from 70 to 97% by weight of SiC powder and from 3 to 30% by weight of AlN powder as the sole refractory starting material sources. In general, the SiC powder and AlN powder have oxidized surfaces. Therefore, these materials contain non-negligible amounts of SiO$_2$ and Al$_2$O$_3$, respectively. Accordingly, a sintered article obtained from these refractory starting material sources usually contains at least 0.2% by weight of oxygen, in most cases, from 0.2 to 2% by weight of oxygen.

If the AlN powder is less than 3% by weight, or if the SiC powder is greater than 97% by weight, the average grain size of the grains of the sintered article tends to increase, and the L/R ratio tends to decrease, whereby the proportion of equiaxed grains will increase, and the density and the flexural strength will be low. On the other hand, if the AlN powder exceeds 30% by weight, or if the SiC powder is less than 70% by weight, the flexural strength of the sintered article tends to be low, and the thermal expansion coefficient tends to increase, whereby the thermal shock resistance of the sintered article will decrease.

In this case, the mixture of refractory starting material sources preferably contains from 75 to 95% by weight of SiC powder and from 5 to 25% by weight of AlN powder, whereby a sintered article having higher strength will be obtained.

In another preferred embodiment, the mixture of refractory starting material sources to be used in the preparation of the sintered article, comprises from 60 to 96.8% by weight of SiC powder, from 3 to 25% by weight of AlN powder and from 0.2 to 15% by weight of a Group IIIa element source. In this case, the sinterability will be improved so that adequate density and strength will be obtained at a lower sintering temperature or for a shorter sintering time. Particularly preferred is a mixture comprising from 70 to 95.8% by weight of SiC powder, from 4 to 20% by weight of AlN powder and from 0.2 to 10% by weight of a Group IIIa element source, whereby a sintered article having a density greater than 98% of the theoretical density will be obtained under the sintering condition of from 2000° to 2200° C. for from 2 to 15 hours, and the flexural strength at room temperature and at 1400° C. will be as high as greater than 70 kg/mm$^2$.

Here, the Group IIIa element source is meant for simple substances or compounds of the above-mentioned Group IIIa elements or a mixture thereof. As the compounds of the Group IIIa elements, it is preferred to use oxides of the Group IIIa elements, or oxide sources of the Group IIIa elements such as hydroxides, oxyacid salts or organic acid salts, whereby a liquid phase having a high melting point and a high viscosity will be formed during the sintering, and the liquid phase sintering and the formation of a solid solution having a desired microstructure will be facilitated, and the starting materials are readily available. Further, in a case where carbides, nitrides or silicides of the Group IIIa elements, or mixtures thereof are employed, the high temperature strength will be increased.

According to the present invention, a desired sintered article is obtained from a mixture of refractory starting material sources comprising SiC powder and AlN powder as the essential components and a Group IIIa element source as an optional component. However, the mixture of refractory starting material sources may further contain a specific amount of at least one member selected from the group consisting of a $SiO_2$ source, an $Al_2O_3$ source and $Si_3N_4$, as another optional component.

When the mixture of refractory starting material sources consists substantially of SiC powder and AlN powder only, the oxygen content in the refractory starting material sources is as low as from 0.5 to 2% by weight. In such a case, by an addition of a $SiO_2$ source and/or an $Al_2O_3$ source, it is possible to increase the formation of the liquid phase during the sintering and to facilitate the liquid phase sintering and the formation of the solid solution so that the density and the strength of the sintered article will be improved. It is preferred to incorporate the $SiO_2$ source and/or the $Al_2O_3$ source in an amount of from 0.5 to 10% by weight of the mixture of the refractory starting material sources. If the amount is less than 0.5% by weight, the above-mentioned effectiveness will be small. On the other hand, if the amount exceeds 10% by weight, the strength of the sintered article tends to decrease.

In the case where the mixture of refarctory starting material sources comprises SiC powder, AlN powder and an oxide source of the Group IIIa element, the oxygen content in the refractory starting material sources is from 0.5 to 5% by weight. In this case, it is also preferred to incorporate from 0.5 to 5% by weight of the $SiO_2$ source and/or the $Al_2O_3$ source in the mixture for the same purpose and effect as mentioned above.

For the improvement of the strength of the sintered particle, it is also effective to incorporate from 0.5 to 15% by weight of $Si_3N_4$ in the mixture of refractory starting material sources. If this amount is less than 0.5% by weight, no adequate effectiveness for the improvement will be obtained. On the other hand, if this amount exceeds 15% by weight, the strength of the sintered article tends to decrease.

Further, it is also possible to incorporate both the $SiO_2$ source and/or the $Al_2O_3$ source and $Si_3N_4$ in the mixture of refractory starting material sources. However, the total amount should be less than 20% by weight. When the $SiO_2$ source, the $Al_2O_3$ source and $Si_3N_4$ are incorporated to the refractory starting material sources, the critical value of the SiC powder content may be varied as the case requires.

In summary, the mixture of refractory starting material sources comprises, as calculated as refractory starting materials, from 50 to 97% by weight of SiC powder, from 3 to 30% by weight of AlN powder, from 0 to 15% by weight of a Group IIIa element source and from 0 to 20% by weight of at least one member selected from the group consisting of a $SiO_2$ source, an $Al_2O_3$ source and $Si_3N_4$.

Here, the $SiO_2$ source and the $Al_2O_3$ source are meant for compounds capable of constituting $SiO_2$ and $Al_2O_3$, respectively, as the refractory starting materials, or a mixture thereof. As such compounds, there may be employed not only oxides such as $SiO_2$ itself or $Al_2O_3$ itself, but also hydroxides, hydrates or alkoxides. In some cases, they may be oxyacid salts such as sulfates or nitrates, or organic acid salts.

For the above-mentioned reasons, the Group IIIa element is preferably at least one member selected from the group consisting of Y, La and Ce.

The refractory starting material sources to be used in the present invention may be composed solely of SiC powder, AlN powder, a Group IIIa element source, a $SiO_2$ source, an $Al_2O_3$ source and $Si_3N_4$. However, they may further contain a small amount, e.g. at most 1% by weight, of other refractory starting material sources to an extent not to impair the feature of the present invention.

According to the present invention, the refractory starting material sources as mentioned above are uniformly mixed with or without addition of suitable additives which do not constitute refractory starting material sources. When injection molding or extrusion molding is to be employed, an organic resin such as polystyrene or polypropylene may be used as such an additive. When press molding is to be employed, a binder such as polyvinyl alcohol or carboxymethyl cellulose may be used. In order to obtain a sintered article having a high density and good mechanical properties, it is important to thoroughly mix the starting materials to form a homogeneous mixture by means of e.g. wet ball milling.

It should be mentioned here that in the present invention, the mixture may contain additives such as above-mentioned organic materials which substantially disappear at low temperatures before sintering. However, an addition of carbon or a carbon source such as a phenol resin is not only unnecessary but also undesirable, since such carbon or carbon source is likely to give rise to adverse effects. Namely, when subjected to a high temperature, carbon reduces the oxides in the refractory starting materials and thus acts to remove oxygen, whereby the liquid phase substances required for the liquid phase sintering will be reduced or diminished.

Then, the above-mentioned mixture is molded to obtain a green body. As the molding method, there may be employed any method which is commonly used for the molding of ceramics. Namely, press molding, slip cast molding, injection molding or extrusion molding may suitably be employed.

Then, the green body is sintered in a non-oxidizing atmosphere at a temperature of from 1900° to 2300° C.

The above-mentioned Rafaniello et al. or Ruh et al. have proposed to remove the oxygen content by incorporating carbon to the refractory starting material sources, followed by hot pressing under atmosperic pressure, or by hot pressing in vacuum to obtain a sintered article of a SiC-AlN solid solution. In each case, the sintered article has a microstructure composed mainly of equiaxed grains, and the physical property of the sintered article are not fully satisfactory.

The present inventor has found a new process for producing highly dense high strength sintered article having the above-mentioned microstructure, wherein as opposed to the removal of the oxygen content in the refractory starting material sources, a certain specific amount of oxygen is positively incorporated, and by utilizing a liquid phase formed at the sintering temperature, the liquid phase sintering and the formation of the solid solution are facilitated.

In the present invention, it is possible to employ hot pressing for sintering. However, it is advantageous to employ a sintering method which requires no mold, such as pressureless sintering method as a typical example, and it is thereby possible to obtain a sintered article having superior mechanical properties. The mechanism attributable to such a superior effect is not clearly understood. However, it is conceivable that by the presence of the liquid phase, fine crystal grains are uniformly formed without undergoing exaggerated grain growth, and the reaction for the formation of the solid solution proceeds at a low temperature. Further, it is conceivable that since no mechanical pressure is applied, grains having a high L/R ratio are readily formed, and the low melting liquid phase is readily decomposed during the sintering, whereby a grain boundary phase having a good high temperature property is formed. Further, the pressureless sintering method is most suitable for massproduction of sintered articles having a large size or an intricate shape.

The sintering temperature should be from 1900° to 2300° C. Namely, if the temperature is less than 1900° C., no adequate density or no adequate formation of the solid solution will be attained. On the other hand, if the temperature exceeds 2300° C., the decomposition of SiC or other components tends to increase, whereby a desired highly dense sintered article will not be obtained. The sintering temperature is preferably from 2000° to 2200° C., whereby the above-mentioned difficuties can more certainly be avoided.

The sintering time is preferably from 1 to 24 hours, more preferably from 2 to 15 hours. If the sintering time is too long or too short, there will be the same difficulties as in the case where the sintering temperature is too high or too low.

A non-oxidizing atmosphere is employed for the sintering step, whereby an undesirable reaction such as oxidation of SiC or AlN is suppressed. As such an atmosphere, there may be employed an atmosphere composed mainly of at least one member selected from the group consisting of $N_2$, Ar, He, CO, $H_2$ and $NH_3$. Among them, it is convenient to employ an atmosphere composed mainly of $N_2$, Ar, He, or a gas mixture thereof.

Particularly preferred is an atmosphere composed mainly of $N_2$, because it is not only inexpensive and free from a danger, but also serves to prevent the decomposition of AlN in the green body, whereby the nitrogen content in the sintered article and the high temperature strength will effectively be increased. For this purpose, the pressure of the non-oxidizing atmosphere composed mainly of $N_2$ is preferably kept at a level of from 2 to 50 atm., more preferably from 5 to 40 atm. If this pressure is too low, the effectiveness for the prevention of the decomposition of AlN will be small, and if the pressure is too high, it becomes difficult to improve the density.

The AlN component in the refractory starting material sources is relatively apt to decompose or evaporate at the sintering temperature. In many cases, it is preferred to employ a non-oxidizing atmosphere containing a vapor of Al and/or an Al compound to control the decomposition or evaporation of AlN. In order to prepare such an atmosphere, it is preferred that the green body is sintered with a powder and/or lump of AlN surrounding the green body. As the lump, there may be mentioned a molded body or sintered body of AlN, or crushed fragments thereof. For instance, a crucible made of AlN may be used so that the green body may be placed therein, or the inner lining of the sintering furnace may be made of AlN. In the case where AlN powder is employed, the green body is embedded in the powder for sintering. Further, instead of AlN, a powder mixture of $Al_2O_3$ and SiC, $Al_2O_3$ and C, or $Al_2O_3$, SiC and C, or a lump made of such powder mixture, may likewise be used.

One of the feature of the present invention is that it is thereby possible to conduct the sintering without applying a mechanical pressure by means of a mold as in the case of the hot pressing method. Another advantageous feature is that the pressure of the non-oxidizing atmosphere during the sintering step is maintained at a level of from 0.5 to 1.5 atm., whereby it is unnecessary to use a gas pressure furnace. Thus, the process of the invention is suitable for the mass production of e.g. large size products.

On the other hand, in the case where a non-oxidizing atmosphere composed mainly of $N_2$ is used, it is another desirable feature that the pressure of the atmosphere is maintained at a level of from 2 to 50 atm., as mentioned above.

Further, it is also preferred that the sintered article thus obtained by the sintering step, is treated in a non-oxidizing atmosphere under a pressure of from 20 to 3000 atm. at a temperature of from 1900° to 2300° C. By such treatment, it is possible to remove pores in the sintered article, whereby a sintered article having a density substantially equivalent to the theoretical density is obtainable, and accordingly the strength and the chemical stability of the sintered article will thereby be increased. It is preferred to conduct such treatment under a pressure of from 50 to 200 atm. This can be done by using a gas pressure furnace. In this case, it is possible to obtain a sintered article having a density greater than 99% of the theoretical density. In another preferred embodiment of this treatment, the pressure of the treatment is maintained at a level of from 500 to 2000 atm. This can be done by using e.g. a hot isostatic press. In this case, a sintered article having a density greater than 99.5% of the theoretical density will be obtained.

Now, the present invention will be described in further detail with reference to Examples. However, it should be understood that the present invention is by no means restricted by these specific Examples.

EXAMPLES AND COMPARATIVE EXAMPLES

In Table 1, Test Nos. 1 to 13 represents Examples of the present invention, and Test Nos. 14 to 17 represent Comparative Examples.

In each Test, to a mixture of the refractory starting material sources as identified in Table 1, ethyl alcohol was added and thoroughly mixed in a ball mill to obtain a homogeneous mixture. As the SiC powder, β-SiC powder having a purity of at least 98% and an average particle size of at most 1 μm was employed (except for Test Nos. 3 and 13 wherein α-SiC powder having the same purity and average particle size was used), and other refractory starting material sources employed had a purity of at least 95% and an average particle size of about 2 μm or less.

The homogeneous mixture thus obtained is molded under hydraulic pressure of 2000 kg/cm² into a green body of 20×20×40 mm. This green body was sintered in the gas atmosphere as identified in Table 1 under atmospheric pressure (except for Test No. 4 wherein the pressure was 20 atm.) under the sintering conditions as identified in Table 1, whereby a sintered article was obtained. In each of Test Nos. 5 and 11, the green body was sintered by embedding it in AlN powder. In each of Test Nos. 1, 3 and 13, the green body was sintered by embedding it in a powder mixture of $Al_2O_3$ powder and SiC powder. In Test No. 10, the sintered article was treated in a nitrogen atmosphere under 100 atm. at 2000° C. for 2 hours. In Test No. 11, the sintered article was treated in a nitrogen atmosphere under 2000 atm. at 2050° C. for 2 hours.

The density and the flexural strength of each sintered article or treated article are also shown in Table 1. The flexural strength is three-point flexural strength as measured at room temperature and at 1400° C. with respect to a test piece of 3×3×30 mm cut out from the sintered article.

Figure 2:
FIG. 2 is likewise a scanning electron microscopic photograph showing the microstructure of the sintered article obtained in Example 7.

In the X-ray diffraction patterns of the sintered articles of Test Nos. 1 to 13, a shift was observed with respect to the peak of SiC. Further, from the TEM (Transmission Electron Microscope) observation of thin test pieces of the sintered articles of Test Nos. 1 to 13, it was found that Al and N are present, in addition to Si and C in the major grains. Thus, it was found that the major grains are all made of a SiC-AlN solid solution. From the SEM (Scanning Electron Microscope) observation of the sintered articles of Test Nos. 1 to 13, it was confirmed that they have a microstructure composed mainly of elongated and/or plate-like grains. FIGS. 1 and 2 show the microscopic photographs of the sintered articles of Test Nos. 6 and 7, respectively. From the Figures, the sintered articles of Test Nos. 6 and 7 have an average grain size of 5 μm and 3 μm, respectively. It is seen that in each case, the sintered article is composed mainly of elongated and/or plate-like grains having a L'/R' ratio of at least 7.

With respect to representative sintered articles, their chemical compositions were analyzed. The results thereby obtained are shown in Table 2.

TABLE I

| Test Nos. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Refractory starting material sources (% by weight) | | | | | | | | | | | | | | | | | |
| SiC powder | 90 | 85 | 90 | 75 | 88 | 94 | 89 | 80 | 82 | 94.5 | 89 | 88 | 68 | 97.5 | 60 | 68 | 85 |
| AlN powder | 10 | 15 | 5 | 20 | 10 | 5 | 10 | 15 | 10 | 5 | 10 | 10 | 22 | 0.5 | 35 | 7 | — |
| Compound of Group IIIa element | — | — | — | — | — | $Y_2O_3$ 1 | $Y_2O_3$ 1 | $CeO_2$ 5 | $Y_2O_3$ 8 | $Y_2O_3$ 0.5 | $Y_2O_3$ 1 | $Y_2O_3$ 1 | $La_2O_3$ 5 | $Y_2O_3$ 2 | $Y_2O_3$ 5 | $Yb_2O_3$ 25 | $Y_2O_3$ 5 |
| $Al_2O_3$ | — | — | 5 | — | — | — | — | — | — | — | — | — | 3 | — | — | — | 10 |
| $SiO_2$ | — | — | — | 5 | — | — | — | — | — | — | — | — | 2 | — | — | — | — |
| $Si_3N_4$ | — | — | — | — | 2 | — | — | — | — | — | — | 1 | — | — | — | — | — |
| Sintering conditions | | | | | | | | | | | | | | | | | |
| Sintering temp. (°C.) | 2100 | 2100 | 2050 | 2000 | 2100 | 2100 | 2100 | 2050 | 2100 | 2050 | 2050 | 2100 | 2000 | 2150 | 2050 | 2000 | 2000 |
| Sintering time (hr.) | 5 | 5 | 5 | 10 | 5 | 5 | 5 | 5 | 5 | 5 | 5 | 10 | 5 | 2 | 2 | 2 | 5 |
| Atmosphere | $N_2$ | $N_2$ | $N_2$ | $N_2$ | $N_2$ | Ar | $N_2$ | Ar | $N_2$ | Ar | $N_2$ | $N_2$ | Ar | $N_2$ | Ar | $N_2$ | Ar |
| Properties of sintered articles | | | | | | | | | | | | | | | | | |
| Density (g/cm³) | 3.11 | 3.17 | 3.17 | 3.16 | 3.15 | 3.24 | 3.22 | 3.20 | 3.22 | 3.16 | 3.18 | 2.83 | 3.01 | 3.13 | 3.15 | | |
| Flexural strength (kg/mm²) | | | | | | | | | | | | | | | | | |
| Room temp. | 68.5 | 65.8 | 67.3 | 82.5 | 75.4 | 77.1 | 85.6 | 79.9 | 104.5 | 90.4 | 85.7 | 99.2 | 68.3 | — | 53.1 | 41.3 | 75.3 |
| 1400° C. | 66.3 | 70.7 | 65.3 | 77.3 | 68.3 | 70.8 | 79.6 | 76.5 | 77.6 | 84.1 | 88.4 | 82.4 | 70.1 | — | 39.8 | 20.3 | 50.5 |

TABLE 2

| Chemical composition | Test Nos. | | | |
|---|---|---|---|---|
| | 2 | 4 | 6 | 7 |
| Al (wt. %) | 8.5 | 12.4 | 3.3 | 6.1 |
| N (wt. %) | 3.2 | 5.8 | 0.8 | 1.2 |
| O (wt. %) | 1.5 | 2.2 | 0.8 | 1.2 |
| Y (wt. %) | — | — | 0.4 | 0.5 |

I claim:

1. A silicon carbide sintered article composed essentially of elongated and/or plate-like grains of a SiC-AlN solid solution consisting essentially of from 2 to 20% by weight of Al, from 0.2 to 10% by weight of N, from 0.2 to 5% by weight of O, from 0 to 15% by weight of a Group IIIa element, and the rest being substantially Si and C.

2. The silicon carbide sintered article according to claim 1, wherein the average grain size of the grains is less than 10 μm.

3. The silicon carbide sintered article according to claim 1, wherein the average grain size of the grains is less than 5 μm.

4. The silicon carbide sintered article according to claim 1, which has a density greater than 95% of the theoretical density.

5. The silicon carbide sintered article according to claim 1, which has a density greater than 98% of the theoretical density.

6. The silicon carbide sintered article according to claim 1, which has a flexural strength of greater than 60 kg/mm² at room temperature and greater than 65 kg/mm² at 1400° C.

7. The silicon carbide sintered article according to claim 1, which has a flexural strength of greater than 65 kg/mm² at room temperature and greater than 70 kg/mm² at 1400° C.

8. The silicon carbide sintered article according to claim 1, which contains from 3 to 15% by weight of Al, from 0.2 to 4% by weight of O and from 0.1 to 10% by weight of a Group IIIa element.

9. The silicon carbide sintered article according to claim 1, which contains from 0.4 to 3% by weight of O.

10. The silicon carbide sintered article according to claim 1, which contains from 0.5 to 2% by weight of O.

11. The silicon carbide sintered article according to claim 8, which has a flexural strength of greater than 70 kg/mm² both at room temperature and at 1400° C.

12. The silicon carbide sintered article according to claim 11, which has a flexural strength of greater than 80 kg/mm² both at room temperature and at 1400° C.

13. The silicon carbide sintered article according to claim 1, wherein the Group IIIa element is at least one element selected from the group consisting of Y, La and Ce.

14. A process for producing a silicon carbide sintered article composed essentially of elongated and/or plate-like grains of a SiC-AlN solid solution, which comprises:
(a) a step of mixing refractory starting material source to form a mixture which comprises, as calculated as refractory starting materials (1) from 50 to 97% by weight of SiC powder, (2) from 3 to 30% by weight of AlN powder, (3) from 0 to 15% by weight of a Group IIIa element source and (4) from 0 to 20% by weight of of at least one member selected from the group consisting of a SiO₂ source, an Al₂O₃ source and Si₃N₄;
(b) a step of molding the mixture to obtain a green body; and
(c) a step of sintering the green body in a non-oxidizing atmosphere at a temperature of from 1900° to 2300° C. wherein the non-oxidizing atmosphere contains a vapor an Al and/or on Al compound.

15. The process according to claim 14, wherein the green body is sintered with a powder and/or lump of AlN surrounding the green body.

16. The process according to claim 14, wherein the green body is sintered with a powder mixture of Al₂O₃ and SiC and/or C, or a lump of such mixture surrounding the green body.

17. The process according to claim 14, wherein the pressure of the non-oxidizing atmosphere is from 0.5 to 1.5 atm.

18. The process according to claim 14, wherein the nonoxidizing atmosphere contains N₂ as the major component and its pressure is from 2 to 50 atm.

19. The process according to claim 14, wherein the mixture contains from 60 to 96.8% by weight of SiC powder, from 3 to 25% by weight of AlN powder, and from 0.2 to 15% by weight of a Group IIIa element source.

20. The process according to claim 14, wherein the mixture contains from 0.5 to 20% by weight of at least one member selected from the group consisting of a SiO₂ source, an Al₂O₃ source, and Si₃N₄.

21. A process for producing a silicon carbide sintered article composed essentially of elongated and/or plate-like grains of a SiC-AlN solid solution, which comprises:
(a) a step of mixing refractory starting material sources to form a mixture which comprises, as calculated as refractory starting materials, (1) from 50 to 97% by weight of SiC powder, (2) from 3 to 30% by weight of AlN powder, (3) from 0 to 15% by weight of a Group IIIa element source and (4) from 0 to 20% by weight of at least one member selected from the group consisting of a SiO₂ source, an Al₂O₃ source and Si₃N₄;
(b) a step of molding the mixture to obtain a green body;
(c) a step of sintering the green body in a non-oxidizing atmosphere at a temperature of from 1900° to 2300° C.; and
(d) a step of treating the sintered body in a nonoxidizing atmosphere under pressure of from 20 to 3000 atm. at a temperature of from 1900° to 2300° C.

22. The process according to claim 21, wherein the sintered body is treated in an atmosphere under pressure of from 50 to 200 atm.

23. The process according to claim 21, wherein the sintered body is treated in an atmosphere under pressure of from 500 to 2000 atm.

24. A process for producing a silicon carbide sintered article composed essentially of elongated and/or plate-like grains of a SiC-AlN solid solution, which comprises:
(a) a step of mixing refractory starting material sources to form a mixture which comprises, as calculated as refractory starting materials, (1) from 60 to 96,8% by weight of SiC powder, (2) from 3 to 25% by weight of AlN powder, (3) from 0.2 to 15% by weight of a Group IIIa element source and (4) from 0 to 20% by weight of at least one member selected from the group consisting of a SiO₂ source, an Al₂O₃ source and Si₃N₄;
(b) a step of molding the mixture to obtain a green body; and
(c) a step of sintering the gree body in a non-oxidizing atmosphere at a temperature of from 1900° to 2300° C.

25. The process according to claim 24, wherein the pressure of the non-oxidizing atmosphere is from 0.5 to 1.5 atm.

26. The process according to claim 24, wherein the non-oxidizing atmosphere contains N₂ as the major component and its pressure is from 2 to 50 atm.

27. The process according to claim 24, wherein the mixture contains from 0.5 to 20% by weight of at least one member selected from the group consisting of a SiO₂ source, an Al₂O₃ source and Si₃N₄.

* * * * *

UNITED STATES PATENT AND TRADEMARK OFFICE
CERTIFICATE OF CORRECTION

PATENT NO. : 4,569,922

DATED : February 11, 1986

INVENTOR(S) : Keiichiro SUZUKI

It is certified that error appears in the above-identified patent and that said Letters Patent is hereby corrected as shown below:

At columns 11-12, in Table I, the "Density (g/cm$^3$)" for Test Nos. 6 through 17 should be tabulated as follows:

-- 
| Test Nos. | 6 | 7 | 8 | 9 | 10 | 11 | 12 | 13 | 14 | 15 | 16 | 17 |
|---|---|---|---|---|---|---|---|---|---|---|---|---|
| Density (g/cm$^3$) | 3.16 | 3.15 | 3.24 | 3.22 | 3.20 | 3.22 | 3.16 | 3.18 | 2.83 | 3.01 | 3.13 | 3.15 |
--

Signed and Sealed this

Third Day of June 1986

[SEAL]

Attest:

DONALD J. QUIGG

Attesting Officer

Commissioner of Patents and Trademarks